Dec. 11, 1951  A. C. MAYER ET AL  2,578,568
GAS-LIQUID SEPARATOR
Filed Nov. 1, 1947
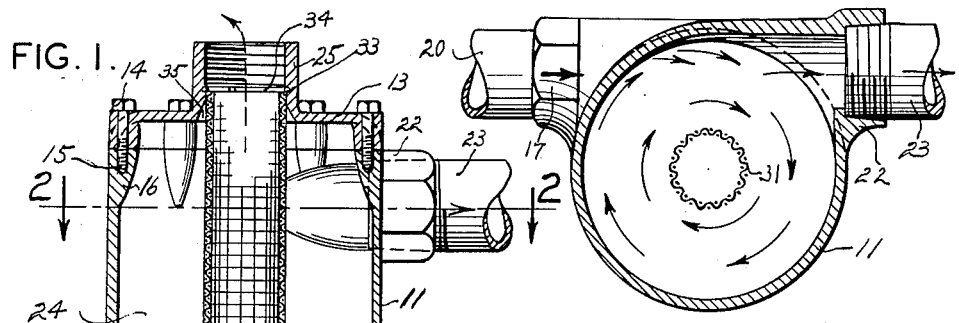
FIG. 1.
FIG. 2.
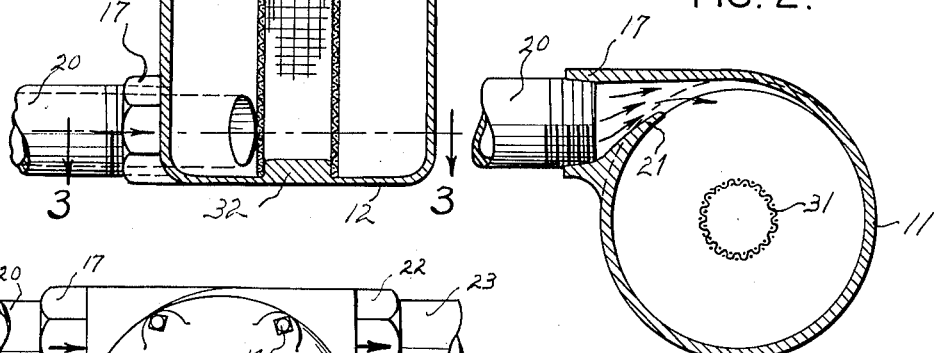
FIG. 3.
FIG. 4.
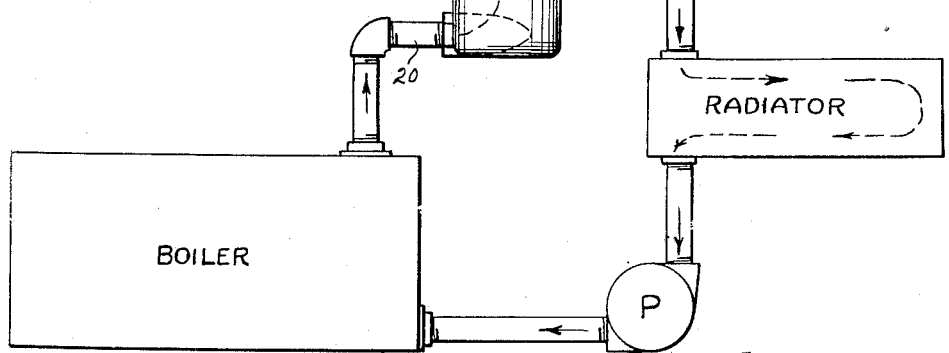
FIG. 5.
INVENTORS,
ALBERT C. MAYER
JOSEPH J. BLACKMORE
BY Robert B. Terry
ATTORNEY Patented Dec. 11, 1951

2,578,568

UNITED STATES PATENT OFFICE 2,578,568

GAS-LIQUID SEPARATOR

Albert C. Mayer, St. Louis, Mo., and Joseph J. Blackmore, Edwardsville, Ill.

Application November 1, 1947, Serial No. 783,576

1 Claim. (Cl. 183—2.5)

This invention relates to improvements in gas-liquid separators, and more particularly to apparatus for the continuous removal of gases or vapors from liquids in which they are occluded or entrained. The present development is particularly adapted for use in effecting removal of air from water, as in a hot water heating system.

A number of so-called centrifugal separators have heretofore been proposed for various fields of use, for separating air or other gas from water or other liquids by centrifugal action. Some such devices have been utilized for the removal of entrapped air from the water in a closed circuit heating system, but are only indifferently efficient for their intended purpose. It is accordingly a general and principal object of the present improvements to effect a virtually complete separation of the entrained air from the water of a liquid circulating system of the general type referred to.

Yet another objective of the present improvements is attained in a novel combination of elements serving to attain a considerably augmented path of travel of the liquid from which gas separation is to be effected.

A further important object of the present invention is attained in a novel combination of elements such that, in a system of the type referred to, the velocity of the mixture of fluids to be separated, is considerably augmented over that prevailing in the other parts in the system, whereby to effect a more thorough or complete centrifugal parting of the principal components of the mixture.

Still further objectives including a novel provision for collecting the air once separated from the water and removing same from the zone of actual separation; an improved mounting arrangement for a vortex tube and relation thereof to other parts of the assembly; an improved, low cost jet or nozzle structure for augmenting velocity of the mixture subjected to centrifugal separation, and an improved general arrangement and juxtaposition of the several parts such as to insure completeness of separation without subsequent mixture.

For brevity of description reference will be made to the parts and general principles of the device as adapted to the removal of air from the water of a hot water heating system, but with the express understanding that the terms "air" and "water" are used in the sense of exemplifying similar gaseous or vaporous substances on one hand, and liquids on the other, certain of the present principles being applicable generally to the separation of fluids of whatever type or phase, so long as they are of different specific gravities.

The objects above expressed and others implied from the description to follow will become more readily apparent from the following detailed description of a single preferred and selected example, particularly when considered in connection with the accompanying drawing, in which:

Fig. 1 is a vertical sectional elevation through a separator assembly embodying the present improvements;

Fig. 2 is a horizontal sectional elevation as taken along line 2—2 of Fig. 1;

Fig. 3 is a view similar to Fig. 2 but taken along line 3—3 of Fig. 1;

Fig. 4 is a top or plan view of the device, and

Fig. 5 is a flow diagram illustrating one manner of installation of the separator in the circuit of a hot water heating system.

Referring now by characters of reference to the drawing, the separator assembly includes a preferably cylindrical, vertical metal housing or casing generally indicated at 10. This may be of cast construction as shown, or formed of spun or pressed sheet material, or by other suitable methods. It comprises, in the form illustrated, a one-piece cylindrical body including a wall 11, an integral bottom 12 and a detachable top closure 13, the latter secured in place as by screws 14 for which suitable cover apertures are provided, and engaging tapped recesses 15 in bosses 16 formed integrally with the wall structure 11. A suitable gasket, not shown, is preferably employed between the top or cover 13 and body 11.

Located so as to discharge the mixture of water and air in a substantially tangential direction into the lower region of the casing 10, is an inlet fitting 17, which may be of external hexagonal conformity as shown, and which is internally threaded to receive the inlet pipe 20. As will best appear from Fig. 3, the discharge end of the fitting 17 is considerably constricted to constitute thereof a distinct throat, nozzle or jet. Although such a jet element may be separately formed and secured in place as by threading, one economical arrangement consists in extending the metal of the adjacent wall 11, partly across the inlet port which would otherwise appear in this zone, such extension or lip being indicated at 21. It is a preference so to extend the port-constricting structure as to reduce the inlet area otherwise presented in such zone, to a value of one-third of that otherwise existing but for the constriction. As will now appear, this reduction of area of the inlet port will considerably enhance the entering velocity of the mixture of fluids, such as air and water.

Generally similar to the inlet fitting 17, is a water discharge or outlet fitting 22 located tangentially of the same side of the cylindrical container 10 as the inlet passage fitting. In the preferred example the axes of the outermost portions of the inlet and discharge fittings are coplanar. It will be noted however, that the water discharge fitting 22, threadedly engaged by the water discharge line 23, is in an upper region of the casing 10, although preferably appreciably below the inside of cover 13, hence below the top of the separation chamber indicated at 24. Such an arrangement of inlet and outlet passages best realizes on the natural tendency of the air to rise in moving from bottom to top of the separation chamber. Were the water discharge fitting located in the uppermost portion of the chamber 24, there would be some probability that, under conditions of extreme initial aeration, some of the air initially separated might be entrained by the out flowing air-freed water. It should be noted as a distinct advantage, reflected in greater efficiency of air removal, that the inlet and outlet are tangent to the same side of the separation chamber, rather than being on opposite sides, the present arrangement compelling at least one complete spiral of the mixture incident to traversal of the chamber by the liquid. As will probably best appear from Fig. 2, the incoming liquid, virtually of necessity when moving at any appreciable velocity, makes at least one complete revolution about the axis of the cylindrical chamber prior to its discharge therefrom. That, in fact, numerous such full circuits are completed in assembly is evidenced by numerous experiments conducted with transparent casings and fittings, and by the use of suitable stains enabling clear observation of the liquids under test in their course through the separator. The location of the inlet fitting somewhat above the bottom of casing 10 provides a sediment trap in the lower part of the separation chamber.

A third connection to the separation chamber 24 is provided by the fitting 25 which may as shown, be formed as an integral upstanding tubular extension of the cover 13. The connection 25 is suitably threaded to receive a nipple 26, shown as connected to an automatic air vent device generally indicated at 30, and which may be of any suitable type of which several are available to the trade, such device serving to relieve the assembly of air without water loss. Alternately, the fitting 25 may be connected to an expansion tank or the like, or in other fields of use, to a vacuum device.

The combination presenting the greatest efficiency includes an axial vortex tube indicated at 31. The device is operative with considerable advantage even though the tube 31 be imperforate, but for best results the vortex tube 31 is constructed of a foraminous material such as a fine mesh screen, but may otherwise be constructed of a profusely perforate sheet metal structure. The tube 31 preferably extends at least from end to end of the separation chamber 24, and is conveniently anchored in assembly and held in its axial position by a short upstanding boss 32 which may, in a casting, be formed integrally with the bottom 12 of the structure 10, and be very slightly tapered, so that the screen tube 31 will fit snugly thereover. The opposite end of the tube is shown, for a purpose to be described, as extending somewhat up into the air take-off fitting 25, the latter being internally circumferentially grooved as seen at 33, the groove serving to receive a snap ring 34. The ring and groove are so proportioned that the former projects into the passage immediate adjacent the end of tube 31, providing an abutment and retention means therefor. Replacement of the tube 31 may be readily effected by removal of the ring 34 with a special tool therefor, and its reinsertion following replacement of the tube. This is only infrequently required, as the tube 31 is preferably made of a non-corrosive material such as copper or the like.

A further improved feature of the construction best appears in Fig. 1, and consists of an annular frusto-conical pocket or recess 35. This pocket functions in the manner of an inverted cup or air trap immediately about the upper portion of the tube 31. Since in operation air particles and bubbles will rise along and externally of the tube, such air particles will be entrapped and coalesced in the recess 35, thence passed through the end margin of screen 31 to the vent. Usually a lesser proportion of the air will find its way through the screen, and will rise therein for discharge immediately into the passage in fitting 25.

It is considerably preferred in a hot water heating installation, to utilize the present device with a circulating pump P. The flow diagram of Fig. 5 shows one suitable manner of installation of the device between the boiler and the radiator, being shown connected in a closed circuit, the line of flow through which is indicated by the arrows.

In operation the device, involving no necessity for any moving elements of structure other than the liquid or liquid-air mixture, functions by centrifugal effect derived through fluid motion. In a system equipped with a pump, the normal rate of flow is augmented by the jet at the entrance of the separation chamber, and identified with the constricted port attained by the extension or lip 21. The rapidly swirling air-water mixture will rise, and the liquid and air are separately taken out, each in an upper region of the separation chamber. The diameter of the tube 31 in proportion to the internal diameter of the casing 10, is preferably such that the vortex effect is virtually confined to the annular space externally of the tube, while the water and air mixture within the tube, is virtually static. The separating action in this static zone has been found to consist of a more or less solely gravimetric system of fluid separation in this region. This effect is however markedly augmented by the considerable pressure differential between the central or axial zone, and that existing in the peripheral portions of the separation chamber. The relatively reduced pressure on the liquid within the screen and in the axial region, results in release of a substantial part of the air in solution, while the centrifugal action, much more pronounced in the outer regions of the chamber, releases the free air particles. Since all of the mixture traverses virtually all parts of the chamber 24 the entire fluid content of the system is repeatedly subjected to this dual separating action.

As applied to hot water heating systems of usual type, the preferred proportion of diameters of chamber and tube, is to select a tube 31 of the order of one-fourth to one-third the internal diameter of the separation chamber. This proportion may of course be varied, and it is sugested that the tube diameter be decreased with any considerable increase in initial mixture velocity, and vice versa, other conditions remaining the same.

In practice and as based on experimental observations, a virtually complete separation of air, other than that in true solution, will be attained by the device described.

Although the improvements have been described by making particularized reference to a single preferred embodiment, the detail of description is not to be understood as restrictive, numerous variants being possible within the principles disclosed and within the fair scope of the claim hereunto appended.

We claim as our invention:

In an air separation device for use in a hot water heating system, a cylindrical casing provided with a lower tangentially arranged inlet connection, and an upper tangentially arranged outlet connection, an axial screen tube, a boss carried by and projecting upwardly from the bottom of the casing and extending into the bottom of the screen tube to provide against lateral displacement and for mounting and support thereof, a top head on the casing, an air discharge fitting axially of the top head, the head being provided with a passage to the fitting from the interior of the casing, said passage being provided with an undercut ring groove, and a snap ring interfitting said ring groove and projecting inwardly of said passage to constitute an abutment for the outer end of said screen tube.

ALBERT C. MAYER.
JOSEPH J. BLACKMORE.

REFERENCES CITED

The following references are of record in the file of this patent:

UNITED STATES PATENTS

| Number | Name | Date |
|---|---|---|
| 1,505,744 | Stebbins | Aug. 19, 1924 |
| 2,200,620 | Findley | May 14, 1940 |
| 2,223,112 | Lear | Nov. 26, 1940 |
| 2,365,574 | McWane | Dec. 19, 1944 |
| 2,434,596 | Spieth | Jan. 13, 1948 |